United States Patent [19]  
Takamori et al.

[11] 4,088,707  
[45] May 9, 1978

[54] RESIN COMPOSITION FOR POWDER COATINGS

[75] Inventors: Shigeru Takamori, Osaka; Kazutaka Yamashita; Yoshinao Kono, both of Wakayama, all of Japan

[73] Assignee: Kao Soap Co., Ltd., Tokyo, Japan

[21] Appl. No.: 781,856

[22] Filed: Mar. 28, 1977

[30] Foreign Application Priority Data

Apr. 16, 1976   Japan ................................. 51-43186

[51] Int. Cl.$^2$ ............................................. C08L 63/00
[52] U.S. Cl. ................................ 260/835; 260/830 P; 427/77
[58] Field of Search .............................. 260/835, 830 P
[56] References Cited

U.S. PATENT DOCUMENTS

| | | | |
|---|---|---|---|
| 3,182,073 | 5/1965 | Loncrini | 260/78 TF |
| 3,437,671 | 4/1969 | Sandler | 260/835 |
| 3,548,026 | 12/1970 | Weisfeld | 260/835 |
| 3,555,111 | 1/1971 | Benham | 260/835 |
| 3,674,892 | 7/1972 | Aggias | 260/835 |
| 3,677,920 | 7/1972 | Kai | 260/835 |
| 3,960,980 | 6/1976 | Yukuta | 260/835 |
| 3,978,154 | 8/1976 | Yukuta | 260/835 |
| 4,000,214 | 12/1976 | Lum | 260/835 |
| 4,036,906 | 7/1977 | Finelli | 260/830 P |

*Primary Examiner*—Paul Lieberman  
*Attorney, Agent, or Firm*—Blanchard, Flynn, Thiel, Boutell & Tanis

[57] ABSTRACT

A thermosetting resin composition useful in a powder coating composition comprising a polyepoxy compound and a polycarboxylic acid obtained by reacting (1) one mole of a diol compound prepared by reacting (i) one mole of an organic diisocyanate, with (ii) from 1.5 to 4.0 moles of a polyoxyalkylene ether of a dihydric phenol, with (2) 1 to 4 moles of trimellitic acid or anhydride thereof.

11 Claims, No Drawings

RESIN COMPOSITION FOR POWDER COATINGS

BACKGROUND OF THE INVENTION

1. Field of the Invention

The present invention relates to a resin composition for powder coatings.

2. Description of the Prior Art

With the recent development of the technique of electrostatic powder coating of objects, powder coating compositions have been noted as being valuable. Powder coatings have various advantages. For example, unlike solvent-type paints, powder coatings do not contain volatile solvents at all and hence, they do not cause environmental pollution. The coated articles can be used immediately after coating and a thick coating can be obtained by one coating operation. Because of these advantages, the use of powder coatings has been rapidly increasing in recent years.

As resins for powder coatings, there have heretofore been used thermoplastic resins such as polyvinyl chloride, nylon and polypropylene, and thermosetting resins such as epoxy resins, thermosetting polyester resins and thermosetting acrylic resins. In general, thermoplastic resins are disadvantageous because the use of a primer is indispensable and the properties of the resulting coatings are insufficient. Accordingly, investigations have been made vigorously to develop powder coatings comprising thermosetting resins.

Epoxy resins having thermosetting characteristics provide coatings which are excellent in corrosion resistance, water resistance, adhesion to metals and mechanical strength, but coatings made from a powder coating composition comprising an epoxy resin are inferior in weatherability. As a thermosetting resin capable of overcoming this disadvantage, there can be mentioned a thermosetting acrylic resin, and it provides coatings possessing excellent weatherability and surface smoothness. Thermosetting acrylic resins are used in powder coatings for painting automobiles and household electric appliances. However, the thermosetting acrylic resin is inferior to the epoxy resin in corrosion resistance and adhesion to metals. Most of the thermosetting polyester resins have properties intermediate between the properties of epoxy and thermosetting acrylic resins, but because a good balance of the various required properties of coatings cannot be attained with thermosetting polyester resins, the utilization thereof has lagged behind the use of other resins. Thus, various powder coatings have advantages and disadvantages and powder coating compositions having fully satisfactory properties have not been developed.

SUMMARY OF THE INVENTION

We have discovered a novel thermosetting resin composition for powder coatings which provides a powder coating composition having satisfactory properties, especially excellent smoothness, adhesion and mechanical properties (such as impact resistance and hardness) of the coatings made therefrom.

More specifically, in accordance with the present invention, there is provided a resin composition for powder coatings comprising (A) a polycarboxylic acid obtained by reacting
(1) a diol compound formed by reacting
  (i) an organic diisocyanate, with
  (ii) 1.5 to 4 moles, per mole of the diisocyanate, of a polyoxyalkylene ether of a dihydric phenol having the formula

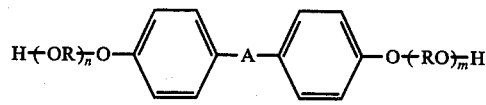

wherein A is alkylene having 1 to 4 carbon atoms or carbonyl, R is alkylene having 2 to 4 carbon atoms, and each of $m$ and $n$ is a number of at least 1 and the sum of $m$ and $n$ is in the range of from 2 to 14, with (2) trimellitic acid or trimellitic anhydride in an amount of 1 to 4 moles per mole of said diol compound, and (B) polyepoxy compound.

As the organic diisocyanate (i) that is used as a starting material for preparing the polycarboxylic acid (A) in the present invention, any organic compound containing 2 isocyanate groups can be used. Aromatic diisocyanates such as 2,4-tolylene diisocyanate, 2,6-tolylene diisocyanate, 4,4-diphenylmethane diisocyanate, m-phenylene diisocyanate, p-phenylene diisocyanate, 1,5-naphthylene diisocyanate and dichlorodiphenylmethane diisocyanate are preferably employed. Further, mixtures of diisocyanates, for example, a mixture containing 2,4-tolylene diisocyanate and 2,6-tolylene diisocyanate, mixed at a weight ratio of 80 : 20, can be used.

The polyoxyalkylene ether of the dihydric phenol (ii) having the above formula, that is used as a starting compound for preparing the polycarboxylic acid (A) in the present invention, can easily be prepared by reacting the corresponding dihydric phenol

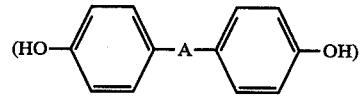

with an alkylene oxide having 2 to 4 carbon atoms, in the presence of a catalyst such as an alkali metal catalyst.

As the starting dihydric phenol used to make the polyoxyalkylene ether of the dihydric phenol, there can be used, for example, 2,2-di-(4-hydroxyphenyl)propane, di-(4-hydroxyphenyl)methane, 2,2-di-(4-hydroxyphenyl)butane and 4,4-dihydroxyphenylketone.

As specific examples of the alkylene oxide that is used as the starting material for preparing the polyoxyalkylene ether of the dihydric phenol (ii), there can be mentioned ethylene oxide, propylene oxide and butylene oxide, and halohydrins thereof.

As special examples of the polyoxyalkylene ether of the dihydric phenol (ii) having the above formula, there can be mentioned polyoxypropylene (2)-2,2-di-(4-hydroxyphenyl)propane, polyoxypropylene (6)-2,2-di-(4-hydroxyphenyl)propane, polyoxypropylene (14)-2,2-di-(4-hydroxyphenyl)propane, polyoxypropylene (3)-di-(4-hydroxyphenol)methane, polyoxybutylene (4)-2,2-di-(4-hydroxyphenyl)butane, polyoxyethylene (3)-2,2-di-(4-hydroxyphenyl)propane, polyoxyethylene (10)-2,2-di-(4-hydroxyphenyl)methane, polyoxyethylene (12)-4,4-dihydroxydiphenylketone and polyoxypropylene (2)-4,4-dihydroxydiphenylketone.

A polycarboxylic acid (A) prepared by reacting (1) a diol compound formed by reacting (i) 1 mole of the organic diisocyanate with (ii) 1.5 to 4 moles of the polyoxyalkylene ether of the dihydric phenol, with (2) trimellitic acid or trimellitic anhydride in an amount of 1 to 4 moles of said trimellitic acid or trimellitic anhydride per one mole of said diol compound, is used as the first component of the resin composition, and (B) a polyepoxy compound is used as the second component.

A preferred mixing ratio of the polycarboxylic acid (A) and polyepoxy compound (B) is such that the carboxyl groups of the polycarboxylic acid are present in an amount of from 0.5 to 2.0 equivalents, especially 0.8 to 1.2 equivalents, per 1.0 equivalent of epoxy groups of the polyepoxy compound. It is preferred that both the compounds be melt-mixed at the above-mixing ratio.

The resulting mixture can easily be pulverized and it is stable at normal ambient temperatures. It can be cured by heating, irradiation of light, ionizing radiation and the like.

As the polyepoxide compound, there can be used organic compounds and resins containing an average of more than one oxirane group per molecule, for example, diglycidyl ether of 2,2-di-(4-hydroxyphenyl)propane, triglycidyl isocyanurate, vinylcylohexene dioxide, diglycidyl dimethylhydantoin, polyglycidyl ether of a phenol-novolak resin, diglycidyl ester of tetrahydrophthalic acid, diglycidyl ester of hexahydrophthalic acid and polyepoxy group-containing vinyl compound.

As the coating methods for using the powder coating compositions, there can be mentioned the electrostatic coating method, the fluidized bed dipping method, the flame spray coating method and the like. Powder coatings comprising the resin composition of the present invention can be coated by any of these known coating methods in the conventional manner.

The resin composition of the present invention provides a powder coating composition which is especially excellent in such properties as smoothness, mechanical properties and adhesion of the resulting coating. This characteristic is believed to be due to the bisphenol structure introduced into the main chain of the polycarboxylic acid and which in turn is reacted with the polyepoxy compound. In other words, it is believed that the bulky and relatively immobile structure of the bisphenol is manifested as excellent properties of the cured coating.

For further description of the present invention, illustrative examples will now be described. These examples do not limit the scope of the present invention.

EXAMPLE 1

At 70° C 1 mole of 4,4'-diphenylmethane diisocyanate was reacted with 2 moles of polyoxypropylene (2)-2,2-di-(4-hydroxyphenyl)propane for 3 hours to obtain a diol compound. At 120° C 2 moles of trimellitic anhydride was reacted with 1 mole of the thus-obtained diol compound for 3 hours to synthesize a polycarboxylic acid (A) having a softening point of 77° C. Then, one g-equivalent (235 g) of the thus-obtained polycarboxylic acid (A) was mixed with one g-equivalent (950 g) of diglycidyl ether of 2,2-di-(4-hydroxyphenyl)propane (Epikote 1004 manufactured by Shell Chemical Co.) and 475 g of rutile type titanium oxide (Tipake R-550 manufactured by Ishihara Sangyo Kabushiki Kaisha) as a pigment. The mixture was kneaded at 110° C for 5 minutes by a roll, cooled, pulverized by a mixer, and passed through a 200-mesh sieve (Tyler). The powder that passed through the sieve was coated on a plate of mild steel G-3141 (JIS) which had been treated with zinc phosphate, according to the electrostatic spray coating method using an electrostatic coating machine (Model 720 manufactured by Gema Co.). Subsequently, the curing reaction was conducted at 210° C for 20 minutes.

The thickness of the resulting coating was 75 μ. The properties of the coating were tested according to coating test methods specified by the Japanese Paint Inspection Association. The results obtained are set forth below.

Gloss (60° mirror surface reflection): 99%
Square cut adhesion test: 100/100
Du Pont impact test (500 g, 6 mm diameter): 30 cm
Smoothness: excellent
Erichsen test: 6.1 mm
Pencil hardness: 2H
Acetone tackiness test: no change

EXAMPLE 2

At 70° C 1 mole of a tolylene diisocyanate mixture (containing 2,4- and 2,6-tolylene diisocyanates at a weight ratio of 8 : 2) was reacted with 2 moles of polyoxypropylene (3.7)-2,2-di-(4-hydrophenyl)propane for 3 hours to obtain a diol compound. At 120° C 2 moles of trimellitic anhydride was reacted with the thus-obtained diol compound for 3 hours to synthesize a polycarboxylic acid (A) having a softening point of 96° C. Then, one g-equivalent (360 g) of the thus-obtained polycarboxylic acid (A) was mixed with one g-equivalent (950 g) of diglycidyl ether of 2,2-di-(4-hydroxyphenyl)propane (Epikote 1004 manufactured by Shell Chemical Co.) and 525 g of rutile type titanium oxide (Tipake R-550 manufactured by Ishihara Sangyo Kabushiki Kaisha) as a pigment. The mixture was kneaded at 110° C for 20 minutes by a roll, cooled, pulverized by a mixer, and passed through a 200-mesh sieve (Tyler). The powder that passed through the sieve was coated on a plate of mild steel G-3141 (JIS) which had been treated with zinc phosphate, according to the electrostatic spray coating method using an electrostatic coating machine (Model 720 manufactured by Gema Co.). Subsequently, the curing reaction was conducted at 210° C for 20 minutes.

The thickness of the resulting coating was 60 μ. The properties of the coating were tested as described above. The results obtained are set forth below.

Gloss (60° mirror surface reflection): 90%
Square cut adhesion test: 100/100
Du Pont impact test (500 g, 6 mm diameter): 35 cm
Smoothness: excellent
Erichsen test: 7.3 mm
Pencil hardness: 2H
Acetone tackiness test: no change

COMPARATIVE EXAMPLE 1

To 1 g-equivalent (64 g) of trimellitic anhydride were added 1 g-equivalent (950 g) of Epikote 1004 and 215 g of rutile type titanium oxide, and the mixture was kneaded at 110° C for 5 minutes by a roll. In the same manner as described in Example 1, the mixture was pulverized and coated on a mild steel plate according to the electrostatic spray coating method and the coating was cured.

The thickness of the resulting coating was 72 μ. The properties of the coating were tested. The results obtained are set forth below.

Gloss (60° mirror surface reflection): 64%
Square cut adhesion test: 100/100
Du Pont impact test (500 g, 6 mm diameter): 30 cm
Smoothness: good
Erichsen test: 6.6 mm
Pencil hardness: H
Acetone tackiness test: no change

EXAMPLE 3

At 70° C 1 mole of a tolylene diisocyanate mixture (containing 2,4- and 2,6-tolylene diisocyanates at a weight ratio of 8 : 2) was reacted with 2 moles of polyoxypropylene (6)-2,2-di-(4-hydroxyphenyl)propane for 3 hours to obtain a diol compound. At 120° C 2 moles of trimellitic anhydride was reacted with 1 mole of the thus-obtained diol compound for 3 hours to synthesize a polycarboxylic acid (A) having a softening point of 81° C. Then, one g-equivalent (427 g) of the thus-obtained polycarboxylic acid (A) was mixed with one g-equivalent (950 g) of diglycidyl ether of 2,2-di-(4-hydroxyphenyl)propane (Epikote 1004 manufactured by Shell Chemical Co.) and 476 g of rutile type titanium oxide (Tipake R-550 manufactured by Ishihara Sangyo Kabushiki Kaisha) as a pigment. The mixture was kneaded at 120° C for 5 minutes by a roll, and in the same manner as described in Example 1, the resin composition was pulverized and electrostatically coated on a mild steel plate and the coating was cured.

The thickness of the resulting coating was 72 μ. The properties of the coating were tested. The results obtained are set forth below.

Gloss (60° mirror surface reflection): 98%
Square cut adhesion test: 100/100
Du Pont impact test (600 g, 6 mm diameter): 50 cm
Smoothness: excellent
Erichsen test: 7.7 mm
Pencil hardness: H
Acetone tackiness test: no change

EXAMPLE 4

At 70° C 1 mole of 4,4'-diphenylmethane diisocyanate was reacted with 2 moles of polyoxypropylene (6.7)-2,2-di-(4-hydroxyphenyl)propane for 2.5 hours to obtain a diol compound. At 120° C 2 moles of trimellitic anhydride was reacted with 1 mole of the thus-obtained diol compound for 3 hours to synthesize a polycarboxylic acid (A) having a softening point of 75° C. Then, one g-equivalent (466 g) of the thus-obtained polycarboxylic acid (A) was mixed with one g-equivalent (950 g) of diglycidyl ether of 2,2-di-(4-hydroxyphenyl)propane (Epikote 1004 manufactured by Shell Chemical Co.) and 565 g of rutile type titanium oxide (Tipake R-550 manufactured by Ishihara Sangyo Kabushiki Kaisha) as a pigment. The mixture was kneaded at 100° C for 5 minutes by a roll. In the same manner as described in Example 1, the resin composition was pulverized and electrostatically coated on a mild steel plate and the coating was cured.

The thickness of the resulting coating was 75 μ. The properties of the coating were tested. The results obtained are set forth below.

Gloss (60° mirror surface reflection): 97%
Square cut adhesion test: 100/100
Du Pont impact test (500 g, 6 mm diameter): 40 cm
Smoothness: excellent
Erichsen test: 6.9 mm
Pencil hardness: 2H
Acetone tackiness test: no change The embodiments of the invention in which an exclusive property or privilege is claimed are defined as follows:

1. A resin composition for powder coating compositions consisting essentially of
   (A) polycarboxylic acid obtained by reacting
      (1) a diol compound formed by reacting
         (i) an organic diisocyanate with
         (ii) 1.5 to 4 moles, per one mole of said diisocyanate, of a polyoxyalkylene ether of a dihydric phenol having the formula:

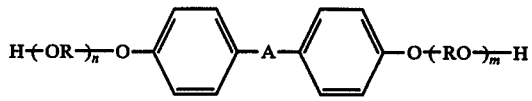

wherein A is alkylene having 1 to 4 carbon atoms or carbonyl, R is alkylene having 2 to 4 carbon atoms, and each of m and n is a number of at least 1 and the sum of m and n is in the range of from 2 to 14,
with
      (2) trimellitic acid or trimellitic anhydride in an amount of 1 to 4 moles of trimelltic acid or trimellitic anhydride per one mole of said diol compound, and
   (B) polyepoxy compound.

2. A resin composition according to claim 1 wherein the polycarboxylic acid (A) and the polyepoxy compound (B) are mixed at such a mixing ratio that the number of carboxyl groups of the polycarboxylic acid present in said composition is from 0.5 to 2.0 equivalents per 1.0 equivalent of epoxy groups of the polyepoxy compound.

3. A resin composition according to claim 1 wherein the organic diisocyanate is an aromatic diisocyanate.

4. A resin composition according to claim 1 wherein A is

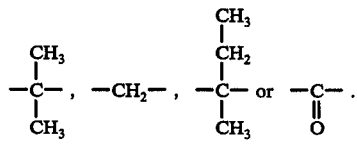

5. A resin composition according to claim 1 wherein the polyepoxy compound is a diglycidyl ether of 2,2-di-(4-hydroxyphenyl)propane.

6. A resin composition for powder coatings according to claim 1 wherein the polyepoxy compound is a member selected from the group consisting of triglycidyl isocyanurate, vinylcyclohexene dioxide, diglycidyl dimethylhydantoin, polyglycidyl ether of a phenolnovolak resin, diglycidyl ester of tetrahydrophthalic acid, diglycidyl ester of hexahydrophthalic acid and polyepoxy group-containing vinyl compound.

7. A resin composition according to claim 1 prepared by melt-blending components (A) and (B) and then pulverizing the resulting mixture.

8. A resin composition according to claim 2 in which the number of carboxyl groups of (A) is from 0.8 to 1.2 equivalents per one equivalent of the epoxy groups of (B).

9. A resin composition according to claim 2 in which the number of carboxyl groups of (A) is about one equivalent per one equivalent of the epoxy groups of (B).

10. A powder paint composition comprising a pigment blended with the resin composition of claim 1.

11. A coated object prepared by coating the object with a powder paint composition as claimed in claim 10, followed by fusing the powder paint composition to form a coating film and curing the resin.

* * * * *